Oct. 26, 1965    W. G. AXTELL    3,213,981
HANDLE FOR LUGGAGE CASES
Filed June 7, 1963    4 Sheets-Sheet 1
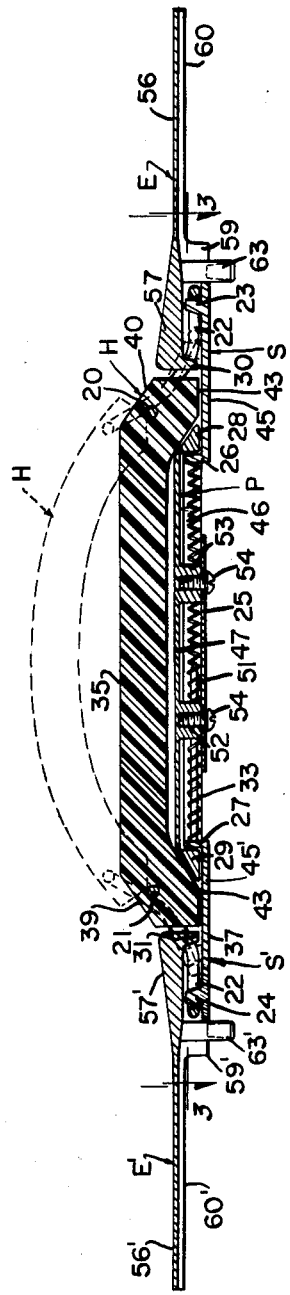
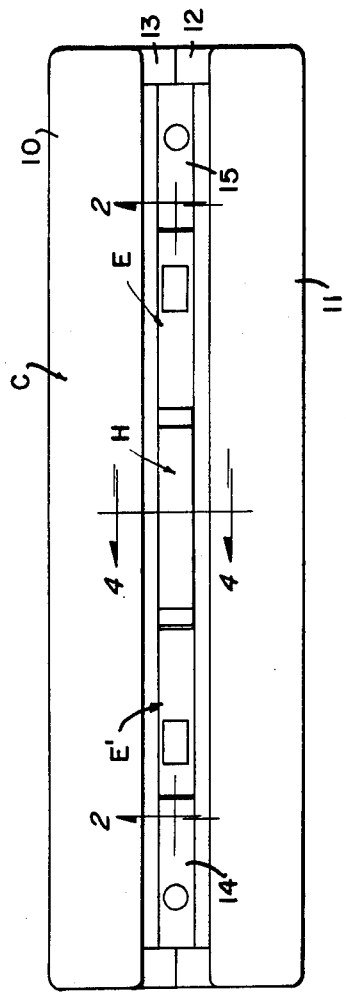
INVENTOR.
WILLARD G. AXTELL
BY
Van Valkenburgh and Fields
ATTORNEYS

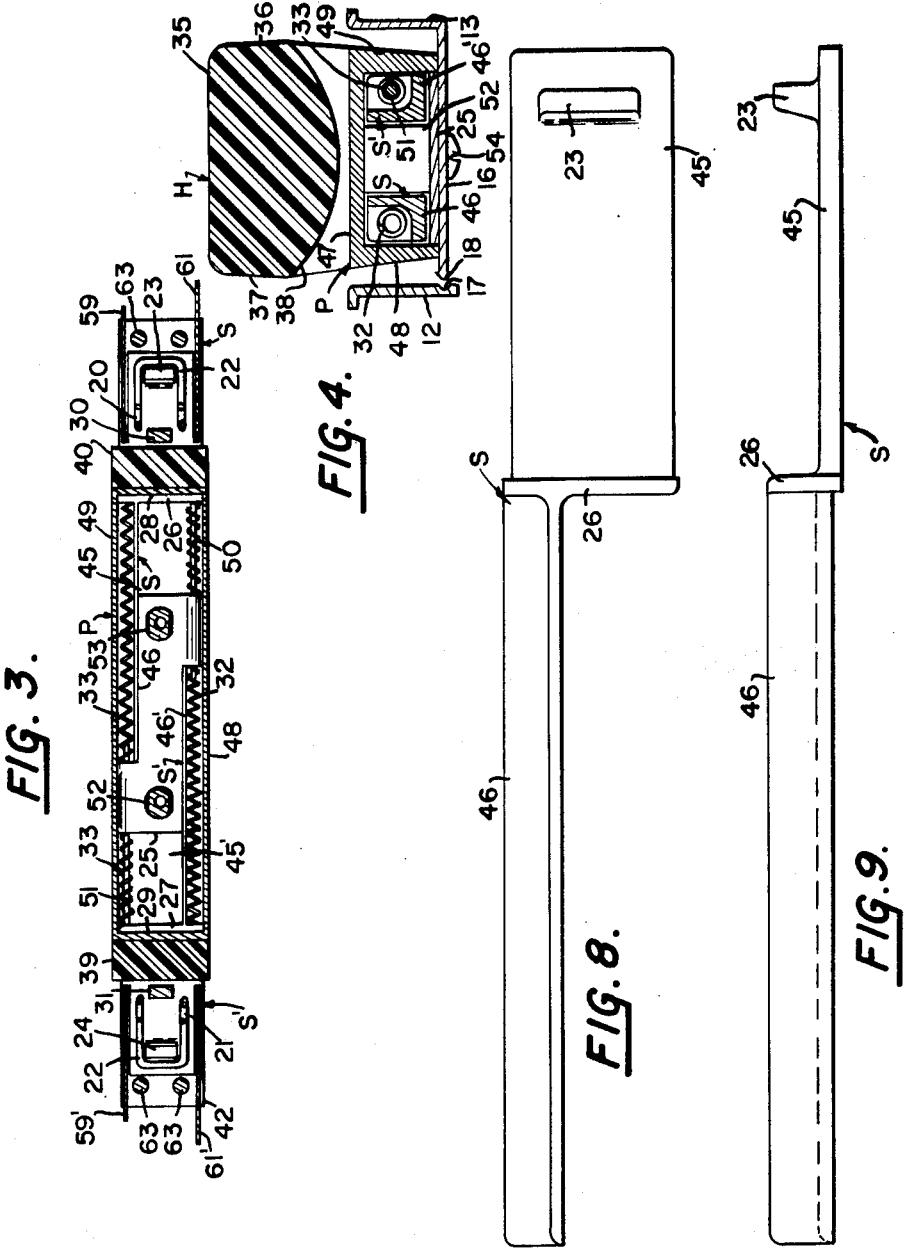

Oct. 26, 1965  W. G. AXTELL  3,213,981
HANDLE FOR LUGGAGE CASES

Filed June 7, 1963  4 Sheets-Sheet 3

INVENTOR.
WILLARD G. AXTELL
BY
Van Valkenburgh and Fields
ATTORNEYS

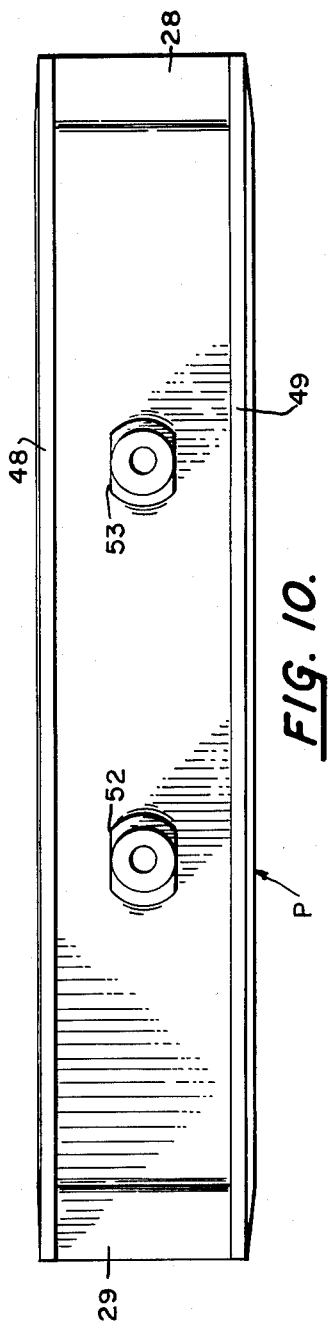
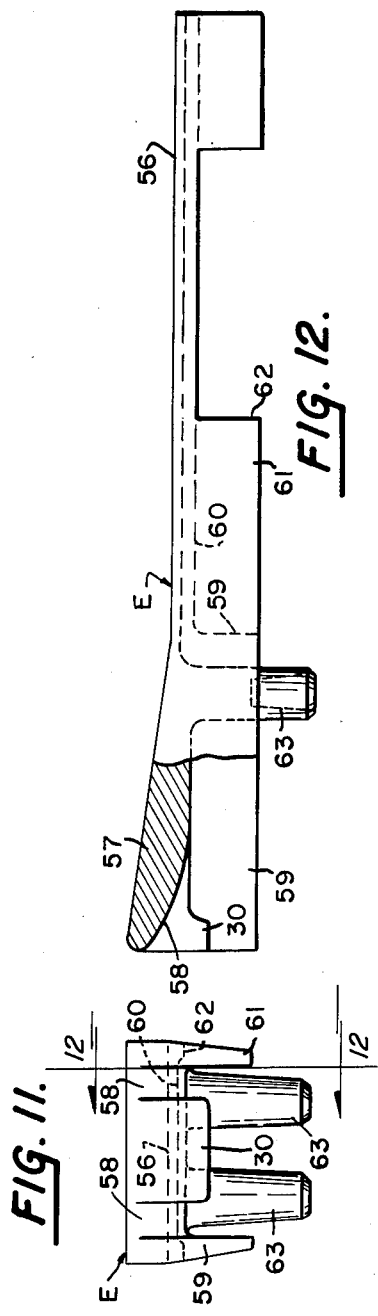

United States Patent Office 3,213,981
Patented Oct. 26, 1965

3,213,981
HANDLE FOR LUGGAGE CASES
Willard Gruehlin Axtell, Englewood, Colo., assignor, by mesne assignments, to Samsonite Corporation, Denver, Colo., a corporation of Colorado
Filed June 7, 1963, Ser. No. 286,217
8 Claims. (Cl. 190—57)

This invention relates to a handle and more particularly to a retractable handle for a luggage case or the like.

Various types and styles of handles have been provided for luggage cases with, however, certain inherent disadvantages. The usual handle comprises an outwardly extending loop, with fixed ends, but this type of handle may become caught or entangled by other objects when not in use. To avoid this difficulty, retractable handles have been developed whose opposite ends are spring urged outwardly. However, these handles have often been complicated in construction so that they are unduly expensive to manufacture, or they have not functioned in a satisfactory manner.

Among the objects of this invention are to provide a novel handle for a luggage case or the like; to provide such a handle for a luggage case or the like which is retractable; to provide such a handle which is readily moved from a retracted position; to provide such a handle which is automatically retracted upon release; to provide such a handle which is easily installed; and to provide such a handle which is of simple yet durable construction.

Additional objects and the novel features of this invention will become apparent from the description which follows, taken in conjunction with the accompanying drawings, in which:

FIG. 1 is a top plan view of a luggage case provided with a retractable handle constructed in accordance with this invention;

FIG. 2 is an enlarged, longitudinal section, taken along line 2—2 of FIG. 1 and showing the handle in raised position in dotted lines;

FIG. 3 is a horizontal section, taken along line 3—3 of FIG. 2, showing particularly the mechanism for retracting the handle;

FIG. 4 is a further enlarged, fragmentary vertical section, taken along line 4—4 of FIG. 1;

FIG. 8 is a further enlarged, top plan view of one of a pair of slides of the mechanism for retracting the handle;

FIG. 9 is a side elevation of the slide of FIG. 8;

FIG. 10 is a further enlarged, bottom plan view of a handle plate;

FIG. 11 is an enlarged end view of an escutcheon for the handle; and

FIG. 12 is a side elevation of the escutcheon of FIG. 11, partly broken away and in section along line 12—12 of FIG. 11.

Figure 5:
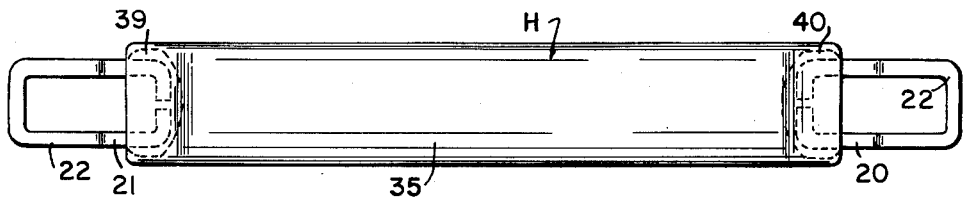
FIG. 5 is a top plan view of the handle, on the same scale as FIG. 2, showing also end loops attached thereto.

In accordance with this invention, a retractable handle H may be installed on a luggage case C of FIG. 1, having opposed halves or sections which respectively include concave shells 10 and 11 attached to a groove strip 12 and a tongue strip 13, respectively. The two halves of the luggage case, when closed, as shown, provide a recess at the top for receiving handle H and other hardware for the luggage case, such as latches 14 and 15 and escutcheons E and E'. Thus, the top recess is conveniently formed by groove strip 12, which forms one side of the recess, as in FIG. 4, and tongue strip 13, which forms the opposite side of the recess and is provided with a lateral tongue 16, which forms the bottom of the recess. Conveniently, groove strip 12 is provided with a groove 17 which receives the inner end 18 of tongue 16 to form a seal between the meeting sections. The parts of the handle attaching and retracting mechanism are preferably proportioned so that they fit entirely within the recess, so that only the handle H projects thereabove, as in FIG. 4. Although tongue 16 extends across the base of the recess, strips 12 and 13 may be offset beneath the ends of latches 14 and 15, so that the parting line will be at the center of the case, around the remainder of the periphery thereof. Also, the strips 12 and 13 may be flush with or extend slightly beyond the inner edges of shells 10 and 11, to provide an appearance similar to that disclosed in the design application of Willard G. Axtell and Allan J. Alvaney, Serial No. D. 73,425, filed February 4, 1963. Latches 14 and 15 may be constructed in the manner of the Lee F. Garmon and Willard G. Axtell U.S. Patent No. 3,034,327, or in any other suitable manner.

Figure 6:
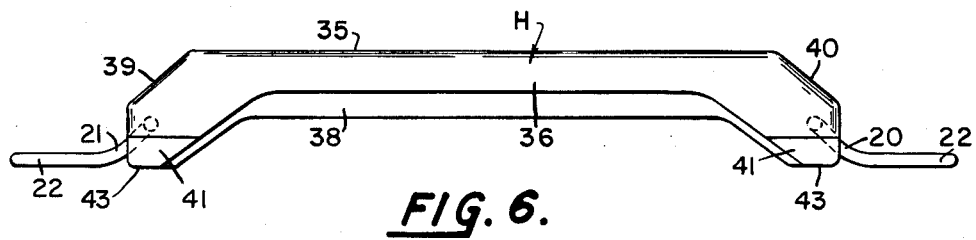
FIG. 6 is a side elevation of the handle and end loops of FIG. 5.
Figure 7:
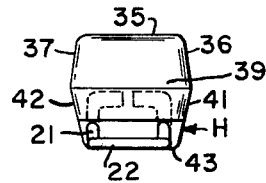
FIG. 7 is an end view of the handle and end loops of FIGS. 5 and 6.

Handle H is provided with metal loops 20 and 21 embedded in the opposite ends thereof, which loops have angular outer ends 22, as in FIG. 6, received over upwardly extending flanges 23 and 24, respectively, on slides S and S', as in FIG. 2. Slides S and S' are mounted for movement along tongue 16 and a lower retaining plate 25 attached to a handle plate P, as in FIGS. 2 and 4, tongue 16 being omitted from FIG. 2 for clarity of illustration. The outward movement of the slides is limited by engagement of upstanding flanges 26 and 27, of the respective slides, with the depending outer ends 28 and 29 of handle plate P, while the inward movement of the slides is limited by depending flanges 30 and 31 at the inner ends of escutcheons E and E', respectively. Each slide S and S' is normally urged to the outer position by coil springs 32 and 33 of FIG. 3, as described below.

Advantageously, the handle H is made of a flexible material, such as vinyl plastic, and, as in FIGS. 4–7, may have a generally flat top 35, slightly outwardly slanting sides 36 and 37 and a convex underside 38, which may be more readily gripped by the fingers of a person carrying the luggage case. Of course, the handle may be of any other suitable cross sectional configuration, such as oval or round, so that the handle will be easy to hold. The downwardly slanted ends 39 and 40 of the handle conveniently have a cross section similar to the remainder of the handle, except for inwardly slanting, lower sides 41 and 42, each end being provided with a flat bottom surface 43 upon which the handle rests when in retracted position. Metal loops 20 and 21 are embedded in the ends, as shown in FIGS. 2, 5 and 6, with the angular ends 22 thereof extending horizontally at each end of the handle, as in FIG. 6. The handle may also be provided with a flat, centrally disposed, strip of spring steel or the like, connected at each end to loops 20 and 21 and embedded within the handle, to increase the resilience of the handle.

Slide S, as in FIGS. 2, 3, 8 and 9, includes a base 45 from which flange 23 extends upwardly for engagement by end 22 of loop 20 of handle H, as shown in FIGS. 2 and 3, so that when the handle H is raised, loop 20 will move slide S inwardly toward the opposite slide S'. Upstanding flange 26 is integral with the inner end of base 45 and is provided with a longitudinally extending arm 46, conventionally angular but with a curved surface on the inside of the angle. Arm 46 of slide S, together with the underside of the top 47 and depending side wall 48 of plate P, as in FIG. 4, form an enclosed space for receiving and guiding spring 32, which is conveniently a coil spring bearing between flange 26 of slide S and flange 27 of slide S'. Slide S', as in FIGS. 2, 3 and 4, is similar but complementary in construction to slide S, thus including a base 45' from which flange 24 extends upwardly for engagement by end 22 of loop 21 of handle H, as in FIG. 3, so that when the handle is raised, loop 21 will urge slide S' inwardly toward slide S, as well as an angular arm 46' extending longitudinally from flange 28. As in FIG. 4, arm 46', together with the underside of top 47 and the opposite depending side wall 49 of handle plate P, form a space for receiving spring 33, which is also conveniently a coil spring bearing between flanges 26 and 27 of the slides. Spring 32 is maintained in position adjacent slide S by means of a rod 50 of FIG. 3, which merely floats within the spring and extends longitudinally from flange 26, on the side opposite arm 46, to a point past the inner end of arm 46' of slide S', with the slides in the extended position of FIG. 3. Similarly, spring 33 is maintained in position adjacent slide S' by means of a rod 51, which extends longitudinally from flange 27, on the side opposite arm 46', to a point past the inner end of arm 46 of slide S. As will be evident, both spring 32 and spring 33 bear against each of slides S and S', at opposite sides thereof, so that when the slides are moved inwardly, both springs will be compressed, but when the slides are released, the springs will return the slides to the extended position of FIG. 3. Since the springs act against the opposite sides of each slide, the slides will move readily between retracted and extended positions, without tendency to bind or twist during such movement. Slides S and S' are conveniently formed by casting, as from the alloy known as "Zamac," while the rods 50 and 51 may be conventional box nails, such as eight penny nails when the springs have an 0.118 inch inside diameter. Rods 50 and 51 may be embedded in the respective flanges 26 and 27 during casting, although this will produce some complications in the die.

In its lower or non-use position, handle H extends across handle plate P, the upper surface of the latter having a longitudinal configuration corresponding to the underside of the handle, as in FIG. 2. In addition to top 47, depending end flanges 28 and 29, and depending side walls 48 and 49, the handle plate P is provided with a pair of longitudinally spaced depending posts 52 and 53 having reduced lower ends which engage holes in retaining plate 25, as in FIG. 2. Advantageously, both retaining plate 25 and handle plate P may be held in place by screws 54 extending through tongue 16 and into central holes in posts 52 and 53, respectively. Posts 52 and 53 also serve as guides for slides S and S'.

The outer ends of slides S and S' conveniently extend beneath escutcheons E and E', respectively, which are similar but complementary in construction. Escutcheon E, as in FIGS. 2, 11 and 12, has a top 56 which extends over a portion of the latch structure and is provided with a thicker front portion 57, the upper surface of which slants upwardly toward the adjacent end of handle H and is provided with a pair of grooves 58, on opposite sides of depending flange 30, and which receive the opposite sides of loop 20 for movement of the handle from the lower to the upper, dotted position of FIG. 2. Escutcheon E has a depending flange 59 on the inner side, i.e., adjacent strip 13, which extends outwardly for a sufficient distance to form an enclosure for loop 20, then a considerably shorter depending flange 60 for the rest of the length of the escutcheon. On the opposite side, a depending side flange 61 extends for the length of the escutcheon, to provide a cover for the latch structure, as well as an enclosure for the opposite side of loop 20, except for a slot 62, which permits a catch mounted on the opposite half of the luggage case to enter the latch, for closing purposes. Escutcheon E is attached to tongue 16 by means of a pair of laterally spaced, centrally-depending posts 63 which are adapted to extend downwardly through holes in tongue 16 and are provided with central holes to enable the lower ends to be headed or riveted over onto the underside of tongue 16. Escutcheon E' is similar but complementary to escutcheon E, thus having, as in FIG. 2, a top 56' having a thicker front portion 57', inside flanges 59' and 60', and depending posts 63' for attachment to tongue 16. In addition, escutcheon E' has grooves on opposite sides of flange 31, corresponding to grooves 58, and an outside flange corresponding to flange 61, provided with a notch corresponding to notch 62.

For greater economy in manufacture, the inside flanges 59 and 59' of escutcheons E and E' may be similar to the outside flanges 61 and 61', so that each escutcheon will be symmetrical about a longitudinal axis. Thus, a single die can be used, since the same part can be placed in either position.

As will be evident, when handle H is raised, both slide S and slide S' will be pulled inwardly by loops 20 and 21, embedded in the opposite ends of the handle, against the compressive force of coil springs 32 and 33. Since the handle is comparatively flexible, it will be pulled upwardly to an arcuate shape, such as shown in dotted lines in FIG. 2, while the loops 20 and 21 will be pulled to an angular position, as also indicated in dotted lines, since the loops are embedded in the handle. Thus, the ends of the handle will be pulled upwardly, which provides more space for the hand of the user. When the handle is released, the tendency for the elastic handle to assume its former position will be normally sufficient to move the slides outwardly until the handle is only slightly bowed. However, the springs insure that the slides will be pushed outwardly to their former position, so that the handle will be retracted to a substantially flat position within the recess between the luggage case sections.

From the foregoing, it will be readily apparent that the objects hereinbefore set forth have been fulfilled to a marked degree. A handle has been provided for a luggage case which is flexible and retractable into a recess between the meeting edges of the case. Furthermore, the handle is retracted partly by its own elasticity and particularly by the action of compression springs which are located between slides, connected to opposite ends of the handle, and normally urge the slides outwardly. Advantageously, the slides are constructed with arms which receive the springs and hold them in position. Furthermore, it is readily apparent that the handle is of simple, yet durable construction.

Although a preferred embodiment of this invention has been illustrated and described, it will be understood that various changes and variations may be made without departing from the spirit and scope of this invention.

What is claimed is:

1. A handle mechanism including a pair of longitudinally spaced slides; means for engaging said slides to limit the outward movement of said slides; spring means extending between said slides for urging said slides outwardly and away from each other; a handle connected at opposite ends to said slides each said slide having an upwardly extending flange; and a pair of escutcheons extending over the outer ends of said slides and each provided with a downwardly depending lip spaced above said slides but adapted to engage said upwardly extending flange upon upward movement of said handle to limit the inward movement of said slides.

2. A handle mechanism including a pair of longitudinally spaced slides having end walls; means for engaging said slides to limit the outward movement of said slides; a pair of spaced coil springs extending between said end walls of said slides for urging said slides outwardly and away from each other; an arm extending inwardly from said end wall of each said slide and adapted to receive one of said springs; and a handle connected at opposite ends to said slides.

3. A handle mechanism for a luggage case and the like having a recess along the upper edges thereof; including a pair of spaced, opposed slides in said recess; a handle plate extending between said spaced slides and having means engaging said slides to limit the outward movement of said slides; spring means extending between said slides for urging said slides away from each other; and a handle connected at opposite ends to said slides, each handle having downwardly extending ends adapted to rest on said slides when said handle is in retracted position and having a configuration on the underside thereof conforming to the configuration of the upper surface of said handle plate so that said handle, when in retracted position, is received over said handle plate in contiguous relation thereto.

4. A handle mechanism, as set forth in claim 2, including a rod disposed in each said spring and extending inwardly from said wall of one slide to said arm of the opposite slide.

5. A handle mechanism for a luggage case and the like having a recess along the upper edges thereof, including a pair of spaced, opposed slides in said recess; a handle plate extending between said spaced slides and having means engaging said slides to limit the outward movement of said slides; spring means extending between said slides for urging said slides away from each other; a handle connected at opposite ends to said slides; and a pair of spaced posts depending from said handle plate and adapted to extend into said recess of said luggage case and adapted to be attached thereto for holding said handle plate in position in said recess.

6. A handle mechanism, as set forth in claim 5, including a base plate adapted to be mounted in said recess under said handle plate and provided with spaced opening for receiving the ends of said posts.

7. A handle mechanism, as set forth in claim 6, wherein the ends of said posts are reduced in cross section.

8. A handle mechanism, as set forth in claim 5, including a pair of escutcheons extending over the respective outer ends of said slides and each provided with a downwardly depending lip spaced above said slide but adapted to engage said upwardly extending flange upon upward movement of said handle, so as to limit the inward movement of said slides; each said escutcheon being provided with at least one depending pin extending into said recess and adapted to be attached thereto for holding said escutcheon in position in said recess.

References Cited by the Examiner

UNITED STATES PATENTS 2,009,192   7/35   Freysinger _____ 150—12
3,016,939   1/62   Lowy _____ 150—33

FRANKLIN T. GARRETT, *Primary Examiner.*